United States Patent
Takase et al.

[15] 3,691,255
[45] Sept. 12, 1972

[54] METHOD FOR THE PREPARATION OF ISOMERIZATION CATALYST AND PROCESS FOR THE ISOMERIZATION

[72] Inventors: Shinji Takase; Tomonori Shioiri, both of Kawasaki, Japan

[73] Assignee: Nippon Oil Company, Limited, Tokyo, Japan

[22] Filed: Feb. 9, 1970

[21] Appl. No.: 10,044

[30] Foreign Application Priority Data

Feb. 20, 1969 Japan......................44/12457

[52] U.S. Cl............260/683.68, 252/442, 252/455 Z
[51] Int. Cl..............................C07c 5/30, B01j 11/40
[58] Field of Search.......252/442, 455 Z; 260/683.68

[56]  References Cited

UNITED STATES PATENTS

| | | |
|---|---|---|
| 3,413,370 | 11/1968 | Fishel...............260/683.68 X |
| 3,542,671 | 11/1970 | Pollitzer............260/683.68 X |
| 3,354,078 | 11/1967 | Miale et al.............252/455 X |
| 3,403,108 | 9/1968 | Leftin et al............252/455 X |
| 3,419,503 | 12/1968 | Giannetti et al..260/683.68 X |
| 3,551,516 | 12/1970 | Ashley et al................252/442 |
| 3,409,682 | 11/1968 | Mitsche............260/683.68 X |

*Primary Examiner*—C. F. Dees
*Attorney*—Stevens, Davis, Miller & Mosher

[57]  ABSTRACT

Method for the preparation of isomerization catalysts which comprises supporting on crystalline aluminosilicate with openings of 6–15A. 0.01–5% by weight of palladium or platinum as calculated in terms of the metal by a conventional procedure and then contacting the alumino-silicate with one or more halogenated hydrocarbons wherein the halogen is fluorine and/or chlorine at a temperature from 0° to 350°C. to make a halogen content of 0.01–20 percent by weight, and process for the isomerization of hydrocarbons which comprises contacting straight or less branched hydrocarbons with said catalyst at a temperature from 15° to 400°C. in the presence of a hydrogen-containing gas to produce more highly branched hydrocarbons.

2 Claims, No Drawings

METHOD FOR THE PREPARATION OF ISOMERIZATION CATALYST AND PROCESS FOR THE ISOMERIZATION

BACKGROUND OF THE INVENTION

1. Field of the Invention

This invention relates to a method for the preparation of isomerization catalysts having very high activities and a process for isomerizing straight or less branched hydrocarbons with the catalyst obtained by said method of preparation to produce more highly branched hydrocarbons.

More particularly, it relates to a method for the preparation of isomerization catalysts which comprises contacting crystalline aluminosilicate with opening of 6–15A. carrying platinum or palladium introduced by a conventional procedure with halogenated hydrocarbons wherein the halogen is fluorine and/or chlorine to make a halogen content of 0.01–20 percent by weight and a process for isomerizing straight or less branched hydrocarbons with the catalyst obtained by said method of preparation in the presence of a hydrogen-containing gas to produce more highly branched hydrocarbons.

2. Description of the Prior Art

As the catalysts for the isomerization of hydrocarbons commercially used or available are mentioned platinum-alumina-halogenide chloride, platinum-alumina, platinum-alumina-halogenide and the like. In addition to its advantages appertain to a solid catalyst, the platinum-alumina halogenide complex catalyst is characterized by its high activity at low temperature. Halogenation for preparing the catalyst is conducted either by attaching or adsorbing aluminum chloride on the surface of alumina by sublimation or the like or by introducing a halomethane such as carbon tetrachloride over platinum-alumina together with a non-reducing gas to effect the combination or adsorption of an elementary halogen by a reaction between the surface of the alumina and the halomethane. Of the two methods the use of halomethane is considered to be superior technically and practically for the halogenation. However, it is not easy to introduce the halogen on the surface of alumina to such a content as required for the preparation of catalyst which is 10 percent by weight in the case of chlorine, and it is necessary to use alumina with a very large surface area or to promote the reaction by elevating the temperature. On the other hand, increase in temperature is accompanied by elimination of the introduced chlorine from the catalyst surface due to formation of aluminum chloride or a volatile substance with the platinum.

In addition, alumina is disadvantageous in that its surface area is at most 300–400 m.$^2$/g. and therefore introduction of chlorine more than 10 percent by weight onto the surface is difficult. So the activity of the platinum-alumina-halogenide catalyst prepared by these methods is not sufficiently satisfactory in the isomerization.

Recently, crystalline aluminosilicate has been paid attention as a carrier or a catalyst being superior to alumina or silica. In fact it exerts better catalytic activity than alumina in the isomerization of hydrocarbons. However, crystalline aluminosilicate exerts sufficiently high activities only when the temperature is raised to a certain degree and does not satisfactorily meet the requirement for the isomerization for which lower temperatures are preferable. Under these circumstances, catalysts which employ aluminasilicate as a carrier and still have satisfactory activities at low temperatures are desired.

Heretofore, introduction of elementary halogen into alumina has been widely investigated, whereas there are few methods for the introduction of elementary halogen into silica-alumina which have not been successful. This is because halogenizing agents such as carbon tetrachloride react only with alumina but not with silica and therefore it is difficult to introduce a halogen such as chlorine into the silica-alumina usually containing a large portion of silica which is advantageous for the catalytic reaction. The same may apply to crystalline aluminosilicate.

SUMMARY OF THE INVENTION

It is an object of this invention to provide catalysts which employ crystalline aluminosilicate as a carrier and have high activities in the isomerization even at low temperatures. Other objects will appear hereinafter.

We have surprisingly discovered that halogenated hydrocarbons including monochlorodifluoromethane and carbon tetrachloride are reactive with crystalline aluminosilicate carrying a metal such as platinum or palladium under specific conditions, and according to the analysis of halogen, the reaction product contains the halogen not by adsorption. We have finally found that the products thus obtained are of outstanding characteristics as a catalyst for isomerization of hydrocarbons.

This invention is concerned with a method for the preparation of isomerization catalysts which comprises contacting crystalline aluminosilicate with openings of 6–15A. carrying platinum or palladium with a halogenated hydrocarbon wherein the halogen is fluorine and/or chlorine to make a halogen content of 0.01–20 percent by weight and a process for the isomerization of straight or less branched hydrocarbons with said catalyst in the presence of a hydrogen-containing gas to produce more highly branched hydrocarbons.

As the crystalline aluminosilicate should be used the aluminosilicate with openings of an effective diameter of 6A. or more in order not to interfere with passage of starting and produced hydrocarbons. The aluminosilicate that has the same basic structure as of natural Forgeous and Moldenite with large openings are preferably used. Synthetic zeolite of the type X or the type Y is available on the market and the latter is preferred. Usually they contain sodium oxide in an equimolar amount to the alumina and may be employed as they are. If higher activities are desired, it is preferable to exchange the sodium ion with a metal ion of two or more valency or with ammonium ion followed by calcination to produce the decationized or hydrogen-type product. As the metal of two or more valency are employed Mg, Ca, Sr, Ba, Zn, Cd, Mn, Ni, Co, rare earth metals and the like. Ratio of the exchange is 50 percent or more and preferably 80 percent or more.

According to the present invention, the platinum or palladium may be introduced by any conventional procedure. The conventional procedure herein means the impregnation method or the ion exchange method in the form of a complex ion such as the ammonium complex. The aluminosilicate carries 0.01–5 percent by weight, preferably 0.05–2 percent by weight of the metal and the carrier with the metal is molded followed by drying and calcination.

The halogenated hydrocarbons used in this invention are hydrocarbons in which one or more of the hydrogen atoms are substituted with chlorine and/or fluorine. Typical examples of the halogenated hydrocarbon are dichloromethane, chloroform, carbon tetrachloride and a series of compounds known by the trade names Freon, Zenetron, Isotron, Ukon and the like such as, for example, carbon tetrafluoride, fluoroform, difluoromethane, monochlorodifluoromethane, monochlorotrifluoromethane, dichlorodifluoromethane, 1,2-bis(monochlorodifluoro)ethane and monofluorobenzene.

An example of the halogenation method will be given below. Crystalline aluminosilicate carrying platinum or palladium is thoroughly dried under hydrogen at a temperature of 350°–550°C. for 3–6 hours. The temperature is then lowered to a predetermined level and the above-mentioned halogenide is contacted with the resulting crystalline aluminosilicate for a predetermined period of time together with a non-reducing gas such as nitrogen, air, oxygen or the like. The unreacted halogenide is expelled using the non-reducing gas only and the catalyst thus produced is cooled and stored in a moisture-proof place. The above reaction may be conducted either in a flow reaction tube or in a closed autoclave. The halogen content after completion of the reaction may be controlled by controlling the reaction temperature and the contact time with the halogenizing agent. The halogen content, which will not necessarily contribute to the catalytic activity if being too much, should be limited to an appropriate range. The range is 0.01–20 percent by weight and preferably 0.1–10 percent by weight. More important is the fact that the catalytic activity cannot be controlled only by the halogen content. The higher the halogenation temperature the more amount of elementary halogen will be introduced. On the other hand, too high temperature employed would result in collapse of crystalline aluminosilicate during the reaction with loss of the inherent activity. Accordingly, the halogenation temperature should be lower in such a range as between 0°C. and 350°C. Preferably, it is from 250° to 350°C. Lower reaction temperature and longer contact time will produce catalysts with desirable halogen content, but it should be noted that the temperature and the time are variable depending upon the halogen used.

The halogenizing agents as mentioned above are various in the reactivity with aluminosilicate and some are reactive at lower temperatures while the others are hardly reactive. In practice, however, more reactive halogenizing agents are preferable, which are carbon tetrachloride, chloroform, dichloromethane, monochlorodifluoromethane, dichlorodifluoromethane, 1,2-bis(monochlorodifluoro) ethane and fluorobenzene and most preferably monochlorodifluoromethane.

The hydrocarbon isomerization reaction using the catalyst prepared according to this invention is carried out in gaseous or liquid phase under the conditions set forth below. As the hydrocarbons are used straight or branched paraffinic or olefinic hydrocarbons and mixtures thereof. Those containing $C_4$–$C_7$ fractions are preferred. The reaction is conducted at a temperature from 15° to 400°C., preferably from 200° to 350°C. Reaction pressures from atmospheric one to 100 kg./cm.$^2$, preferably from atmospheric one to 50 kg./cm.$^2$ may be employed. Liquid space velocity may be 0.05–10 vol./vol./hr., preferably 0.1–5 vol./vol./hr. Molar ratios of hydrogen to hydrocarbon may 0.1–20, preferably 1–10. In accordance with the present invention, the isomerization reaction rate is faster than with non-halogenated crystalline aluminosilicate containing platinum or palladium, and more characteristically, it is satisfactory for practical use even at such low temperatures as are no longer feasible with crystalline aluminosilicate containing platinum or palladium only.

DESCRIPTION OF PREFERRED EMBODIMENTS

The examples which follow are submitted to illustrate and not to limit this invention.

EXAMPLE 1

Experiment 1

A mixture of 50 g. of commercially available zeolite molecular sieve of the type Na–Y in an aqueous solution of calcium nitrate at a molar concentration of 0.05 was heated with stirring at 60°C. for about 3 hours to effect the ion exchange.

The procedure was twice repeated when 90 percent by weight of the sodium originally present was exchanged with calcium. Then the resulting Ca–Y product was transferred to an aqueous solution containing [Pt(NH$_3$)$_4$]$^{++}$ prepared by addition of a large excess of ammonia to K$_2$PtCl$_4$ to make a platinum content of 0.5 percent by weight. The resulting mass was washed with water, molded, dried at 110°C. and calcined at 500°C. (Catalyst A).

Experiment 2

A quartz reaction tube was filled with 1 g. of catalyst A, which was dried and reduced under hydrogen at 500°C. for 3 hours. The reaction tube was then cooled to 200°C. and therethrough was passed nitrogen gas at a velocity of 100 ml./min. for 20 min., the gas having in advance been passed through carbon tetrachloride at 0°C. After completion of the reaction nitrogen gas was passed for additional about 1 hour and the catalyst thus prepared was stored in a moisture-proof vessel. The chlorine content of the catalyst was 6.0 percent by weight (catalyst B).

Experiment 3

A quartz reaction tube was filled with 1 g. of catalyst A, which was dried and reduced under hydrogen at 500°C. for 3 hours. The reaction tube was then cooled to 200°C. and therethrough was passed nitrogen gas at a velocity of 100 ml./min. for 20 min., the gas having in advance been passed through carbon tetrachloride at 0°C. After completion of the reaction nitrogen gas was passed for additional about 1 hour and the catalyst thus prepared was stored in a moisture-proof vessel. The chlorine content of the catalyst was 6.0 percent by weight (catalyst B).

Experiment 3

A quartz reaction tube was filled with 1 g. of catalyst

A prepared in experiment 1 and nitrogen gas was passed through the reaction tube at a velocity of 250 ml./min. while maintaining the temperature at 350°C. for 10 min., the gas having in advance been passed through carbon tetrachloride at 25°C. Nitrogen gas was passed for additional 1 hour to complete the reaction. The chlorine content of the catalyst was 21.6 percent by weight (catalyst C).

Experiment 4

A quartz reaction tube was filled with 1 g. of catalyst A prepared in experiment 1, which was dried and reduced under hydrogen at 500°C. for 3 hours. The reaction tube was then cooled to 250°C. at which temperature $CHClF_2$ was introduced at a flow rate of 50 ml./min. for 20 min. together with nitrogen gas at 100 ml./min. After the reaction nitrogen gas was passed for additional about 1 hour and the catalyst thus prepared was stored in a moisture-proof vessel. Chlorine and fluorine contents of the catalyst were 0.92 percent by weight and 0.94 percent by weight respectively (catalyst D).

Experiment 5

A quartz reaction tube was filled with 1 g. of catalyst A prepared in experiment 1, into which was then introduced $CHClF_2$ at a flow rate of 50 ml./min. together with nitrogen gas at 100 ml./min. for 40 min. while maintaining the temperature at 175°C., followed by introduction of nitrogen gas for about 1 hour to complete the reaction.

Chlorine and fluorine contents of the catalyst were 0.66 percent by weight and 0.44 percent by weight respectively (catalyst E).

Comparative isomerization of n-hexane was carried out using catalysts A through E respectively prepared in experiments 1 through 5 under the same conditions: Atmospheric pressure; 300°C.; molar ratio of hydrogen to hydrocarbon 5; GHSV 1,200 vol./vol./hr. The amount of catalyst employed was 0.5 g., which was thoroughly reduced under hydrogen prior to the reaction. Purity of the n-hexane was 99.0 percent by weight of n-hexane and 1.0 percent by weight of methylcyclopentane. The product were analyzed by gas chromatography to give the results shown in Table 1 in which all the analytical values were the data 1.5 hrs. after initiation of feeding of the starting material.

TABLE 1

| Catalyst Product (wt.%) | Catalyst A | Catalyst B | Catalyst C | Catalyst D | Catalyst E |
|---|---|---|---|---|---|
| Methane | — | — | — | — | 0.06 |
| Ethane | — | 0.03 | 0.10 | 0.04 | 0.10 |
| Propane | 0.31 | 0.25 | 0.25 | 0.77 | 0.64 |
| Isobutane | 0.39 | 0.22 | 0.05 | 0.81 | 0.26 |
| n-Butane | 0.11 | 0.08 | 0.13 | 0.19 | 0.21 |
| Isopentane | 0.25 | 0.17 | 0.05 | 0.53 | 0.25 |
| n-Pentane | 0.09 | 0.08 | 0.08 | 0.12 | 0.16 |
| 2,2-Dimethylbutane | 4.41 | 6.56 | 0.25 | 13.4 | 10.1 |
| 2,3-Dimethylbutane | 4.85 | 4.65 | 0.63 | 6.15 | 4.43 |
| 2-Methylpentane | 26.0 | 27.1 | 4.08 | 30.4 | 28.1 |
| 3-Methylpentane | 15.3 | 16.3 | 2.61 | 17.6 | 16.3 |
| n-Hexane | 47.8 | 44.3 | 91.3 | 29.9 | 38.2 |
| Methylcyclopentane | 0.31 | 0.28 | 0.57 | 0.18 | 0.25 |
| Others | — | — | — | — | — |

As indicated in Table 1, catalysts B, D and E, especially D and E exert outstanding activities as compared with the non-halogenated catalyst A. On the other hand, catalyst C which contains more than 20 percent by weight of halogen has lost almost all of the activity.

EXAMPLE 2

Two grams of catalyst A prepared in experiment 1 were dried and reduced under hydrogen and thereinto was introduced $CHClF_2$ at a flow rate of 50 ml./min. together with nitrogen gas at 100 ml./min. for 10 min. while maintaining the temperature at 250°C. Nitrogen gas was passed thereafter for about 1 hour to complete the reaction. A portion of the catalyst was used for analysis and a portion was filled in a small autoclave. Chlorine and fluorine contents of the catalyst were 0.67 percent by weight and 1.35 percent by weight respectively. In a small autoclave 12 ml. in capacity were placed 0.5 g. of the catalyst and a ml. of n-hexane (purity 99 percent by weight) and then introduced hydrogen at a pressure of 20 kg./cm.$^2$ at room temperature. The autoclave was heated to 300°C. and shaken for 5 min., followed by analysis of the products. The products were: $C_5$ or lower hydrocarbons 5.36 wt.%; n-hexane 43.7 wt.%; 3-methylpentane 14.4 wt.%; 2-methylpentane 25.5 wt.%; 2,3-dimethylbutane 5.66 wt.% and 2,2-dimethylbutane 5.06 wt.%. The above results, while demonstrating the outstanding isomerizing activity of the catalyst according to the present invention, indicate that good results are also produced when the hydrocarbon isomerization reaction is conducted under a high pressure.

EXAMPLE 3

Two grams of catalyst A were dried and reduced under hydrogen and thereinto was introduced $CCl_2F_2$ at a flow rate of 50 ml./min. together with nitrogen gas at 100 ml./min. for 10 min. while maintaining the temperature at 200°C. The vessel was purged with nitrogen to complete the reaction. Chlorine and fluorine contents of the catalyst were 0.16 percent by weight and 0.12 percent by weight respectively. Using the catalyst thus prepared n-hexane (purity 99 percent) was isomerized. The reaction was conducted by a flow method at atmospheric pressure at a temperature of 350°C. with a molar ratio of hydrogen to hydrocarbon of 5 and a GHSV of 3,600 vol./vol./hr. The analytical data 1 hour after initiation of the feeding of the starting material are: $C_1$–$C_3$ 0.84 wt.%; $C_4$ 0.74 wt.%; $C_5$ 0.58 wt.%; n-$C_6$ 39.8 wt.%; 3-methyl-$C_5$ 17.4 wt.%; 2-methyl-$C_5$ 27.7 wt.%; 2,3-dimethyl-$C_4$ 4.76 wt.% and 2,2-dimethyl-$C_4$ 8.04 wt.%.

The above results indicate that the present invention under the conditions given also produces good results similar to those in Examples 1 and 2.

EXAMPLE 4

Ten grams of a commercially available molecular sieve of the type Ca—X were impregnated in a solution of chloroplatinic acid to carry 0.5 percent by weight of platinum. The resulting mass was washed with water, molded, dried at 110°C. and calcined at 500°C. One of the catalyst thus prepared was placed in a reaction tube, into which was then introduced $CClF_2$—$CClF_2$ at a flow rate of 50 ml./min. together with nitrogen gas at 150 ml./min. while maintaining the temperature at 200°C. The vessel was then purged with nitrogen gas to complete the reaction. Chlorine and fluorine contents of the catalyst were 0.07 percent by weight and 0.08 percent by weight respectively. In a reaction tube were placed 0.5 of the catalyst, which were then reduced under hydrogen and contacted with an n-hexane mixture to isomerize the same. The reaction conditions are: Flow method at atmospheric pressure; a temperature of 350°C.; a molar ratio of hydrogen to hydrocarbon of about 5 and a GHSV of 200 vol./vol./hr. The results are shown in Table 2.

TABLE 2

|  | Starting material (wt.%) | Product (wt.%) |
| --- | --- | --- |
| $C_1 - C_2$ | — | 0.55 |
| Propane | — | 2.89 |
| Isobutane | — | 1.0 |
| n-Butane | — | 0.55 |
| Isopentane | — | 1.00 |
| n-Pentane | — | 0.55 |
| n-Hexane | 58.2 | 25.7 |
| 3-Methylpentane | 12.8 | 18.0 |
| 2-Methylpentane | 11.2 | 29.4 |
| 2,3-Dimethylbutane | 1.9 | 5.33 |
| 2,2-Dimethylbutane | — | 12.0 |
| Methylcyclopentane | 15.9 | 3.0 |
| Others | — | — |

The above results indicate that similar good results are obtained also with platinum carried by the impregnation method. It is also indicated that similar good results are obtained also with n-hexane mixture as the starting material.

EXAMPLE 5

In an autoclave purged with nitrogen were placed 1 g. of the Pt—Ca—X shown in Example 4 and 0.5 ml. of $C_6H_5F$. The resulting mass was heated to 200°C. and then allowed to stand for 15 min., followed by purge with nitrogen gas by flowing for about 1 hour to complete the reaction. Fluorine content of the catalyst was 0.24 percent by weight. In a reaction vessel were placed 0.5 g. of the catalyst, followed by reduction with hydrogen. An n-hexane mixture was isomerized using the catalyst thus prepared under the same conditions as in Example 4. The results were similar to those in Table 2, indicating the values similar to a thermodynamically equilibrated composition.

EXAMPLE 6

Five grams of the Ca—Y molecular sieve in Example 1 were impregnated in an aqueous solution containing $[Pd(NH_3)B4]^{++}$ to carry 0.5 percent by weight of palladium. The resulting mass was washed with water, molded, dried at 110°C. and calcined at 500°C. One gram of the catalyst was heated to 200°C. at which temperature $CHClF_2$ was introduced at a flow rate of 50 ml./min. together with nitrogen gas at 100 ml./min. for 10 min. followed by purge with nitrogen gas to complete the reaction. Chlorine and fluorine contents were 0.77 percent by weight and 0.64 percent by weight respectively. A reaction tube was filled with 0.5 g. of the catalyst thus prepared, which were then reduced under hydrogen, and used for isomerization of n-pentane. The reaction was conducted under the conditions: Flow method at normal pressure; a temperature of 350°C.; a GHSV of 600 vol./vol./hr.; a molar ratio of hydrogen to hydrocarbon of 4. The analytical data 1.5 hours after initiation of feeding of the starting material are shown in Table 3.

TABLE 3

|  | Starting material (wt.%) | Product (wt.%) |
| --- | --- | --- |
| $C_1 - C_3$ | — | 0.65 |
| $n-C_4$ | — | 0.29 |
| $iso-C_4$ | — | 1.02 |
| $n-C_5$ | 99.0 | 50.0 |
| $iso-C_5$ | 1.0 | 41.2 |
| $n-C_6$ | — | 5.96 |
| $iso-C_6$ | — | 0.77 |
| Others | — | 0.29 |

The above results indicate that the catalyst carrying palladium has the same activity as one carrying platinum and produces good results in the isomerization of pentane.

EXAMPLE 7

Ten grams of commercially available molecular sieve of the type Na—Y were impregnated in aqueous ammonia to exchange the $Na^+$ with $NH_4^+$ by about 90 percent. The resulting mass was washed with water, molded and dried followed by calcining at 500°C. to eliminate ammonia, thus forming a molecular sieve of the type H—Y. In an aqueous solution of $PdCl_2$ were placed 5 g. of the molecular sieve to carry 0.5 percent by weight of palladium. The palladium-carrying product was dried and sintered. Through 1 g. of the palladium catalyst thus prepared was passed $CCl_2F_2$ at a flow rate of 50 ml./min. together with nitrogen at 100 ml./min for 10 min. while maintaining the catalyst at 200°C., followed by purge with nitrogen to complete the reaction. Chlorine and fluorine contents of the catalyst were 0.69 percent by weight and 0.47 percent by weight respectively. In a reaction tube were placed 0.5 g. of the catalyst, which were then reduced under hydrogen. A mixture of pentane and hexane was isomerized with the catalyst under the conditions: Flow method at normal pressure; a temperature of 350°C.; a molar ratio of hydrogen to hydrocarbon of 5; a GHSV of 600 vol./vol./hr. The analytical data 1 hour after initiation of feeding of the starting material are shown in Table 4.

TABLE 4

|  | Starting material (wt.%) | Product (wt.%) |
| --- | --- | --- |
| $C_1$ | — | 0.31 |
| $C_2$ | — | 0.83 |
| $C_3$ | 13 | 13.5 |
| $n-C_4$ | — | 2.39 |
| $iso-C_4$ | — | 6.66 |
| $n-C_5$ | 13.0 | 12.6 |
| $iso-C_5$ | — | 5.95 |
| $n-C_6$ | 86.0 | 37.6 |
| $iso-C_6$ | — | 19.5 |
| Others | 1.0 | 0.78 |

EXAMPLE 8

In an aqueous solution of manganese nitrate at a concentration of 0.05 moles/l. were placed 10 g. of commercially available molecular sieve of the type Na—Y. The ion exchange was conducted at ordinary temperature to exchange about 72 percent of the Na. The resulting mass was placed in a solution containing [Pd(NH$_3$)$_4$]$^{++}$ to carry 0.5 percent by weight of palladium. The catalyst thus prepared was washed, molded, dried and sintered. Through 1 g. of the catalyst thus prepared was passed CClF$_2$—CClF$_2$ at a flow rate of 50 ml./min. together with nitrogen at 100 ml./min. for 10 min. followed by purge with nitrogen to complete the reaction. Chlorine and fluorine contents of the catalyst were 0.10 percent by weight and 0.09 percent by weight respectively. In a reaction tube were placed 0.5 g. of the catalyst, which were reduced with hydrogen and used for isomerization of butane. The reaction conditions were: Flow method at normal pressure; a temperature of 300°C.; a molar ratio of hydrogen to hydrocarbon of 5; a GHSV of 600 vol./vol./hr.

Gas chromatographic analysis one hour after initiation of feeding of the starting material indicates the production of C$_1$–C$_3$ 11.1 wt.%; n-C$_4$ 32.0 wt.%; iso-C$_4$ 48.6 wt.% and C$_5$ and higher 8.3 wt.%.

EXAMPLE 9

Experiment 1

In an aqueous solution of cadmium nitrate at a concentration of 0.05 moles/l. were placed 10 g. of commercially available molecular sieve of the type Na—Y. The ion exchange was conducted at 60°C. to give an exchange ratio of 71.5 percent. The resulting mass was placed in a solution containing [Pt(NH$_3$)$_4$]$^{++}$ to carry 1.0 percent by weight of platinum. The catalyst thus prepared was molded, dried and calcined. In a reaction tube was placed 1 g. of the catalyst thus prepared, which was then dried and reduced. CCl$_4$ was passed through the catalyst together with nitrogen at a flow rate of 50 ml./min. for 3 min. while maintaining the temperature at 160°C., followed by purge with nitrogen gas for 1 hr. to complete the reaction. Chlorine content of the catalyst was 3.28 percent by weight (catalyst R).

Experiment 2

In aqueous solution of celium nitrate at a concentration of 0.05 moles/l. were placed 10 g. of commercially available molecular sieve of the type Na—Y. The ion exchange was conducted at 60°C. to exchange 68.4 percent of the Na. Then, the resulting mass was impregnated in a solution containing [Pt(NH$_3$)$_4$]$^{++}$ to carry 1.0 percent by weight of platinum. The catalyst thus prepared was molded, dried and calcined. Through 1 g. of the catalyst in a reaction tube was passed CHClF$_2$ at a flow rate of 50 ml./min. together with nitrogen at 100 ml./min. for 10 min. while maintaining the temperature at 200°C., followed by purge with nitrogen to complete the reaction. Chlorine and fluorine contents were 0.165 percent by weight and 0.10 percent by weight respectively (catalyst S).

Experiment 3

In an aqueous solution of zinc nitrate at a concentration of 0.1 mole/l. were placed 10 g. of commercially available molecular sieve of the type Na—X (molded product). The ion exchange was conducted at 60°C. to exchange 77 percent by weight of the Na. Then, using a solution containing [Pt(NH$_3$)$_4$]$^{++}$ 1.0 percent by weight of platinum was introduced. The resulting mass was washed with water, dried and calcined. Nitrogen which had been passed through CHCl$_3$ at 0°C. was passed through 1 g. of the catalyst at a flow rate of 50 ml./min. for 3 min. while maintaining the temperature at 200°C., followed by purge with N$_2$ for for 1 hour. Chlorine content of the catalyst was 4.60 percent by weight (catalyst T).

n-Hexane was isomerized respectively with catalysts R, S and T prepared in experiments 1 through 3. The reaction was conducted under the conditions: Flow method at a normal pressure; a temperature of 300°C.; a molar ratio of hydrogen to hydrocarbon of 5; a GHSV of 1,200 vol./vol./hr. In each experiment were used 0.5 g. of the catalyst which had been reduced with hydrogen at 500°C. for 3 hours. Purity of n-hexane was 99 percent. The data 1.5 hours after initiation of the reaction are shown in Table 5.

TABLE 5

| | Starting material | Catalyst R | Catalyst S | Catalyst T |
|---|---|---|---|---|
| C$_1$ (wt.%) | — | — | 0.27 | 0.15 |
| C$_2$ | | 0.10 | 0.24 | 0.49 |
| C$_3$ | | 0.38 | 0.50 | 1.45 |
| n-C$_4$ | | 0.29 | 0.38 | 0.91 |
| iso-C$_4$ | | 0.17 | 0.43 | 0.51 |
| n-C$_5$ | | 0.17 | 1.93 | 0.30 |
| iso-C$_5$ | | 0.15 | 0.73 | 0.35 |
| n-C$_6$ | 99.0 | 59.4 | 50.3 | 61.0 |
| 3-Methyl-C$_5$ | | 11.6 | 12.18 | 10.2 |
| 2-Methyl-C$_5$ | | 20.6 | 23.81 | 18.5 |
| 2,3-Dimethyl-C$_4$ | | 3.29 | 4.73 | 3.76 |
| 2,2-Dimethyl-C$_4$ | | 3.44 | 4.37 | 2.44 |
| Methylcyclopentane | 1.0 | 0.31 | 0.33 | 0.28 |
| Others | | Trace | Trace | Trace |

The above results indicate that use of Cd, Ce or Zn for exchange of the metal produces good results by halogenation, although being somewhat variable in the result.

We claim:

1. Method for the preparation of isomerization catalysts which comprises contacting crystalline aluminosilicate having openings of 6–15A. on which 0.01 to 5 percent by weight of a member selected from the group consisting of palladium and platinum as calculated in terms of the metal is supported with at least one halogenated hydrocarbons having from one to six carbon atoms wherein the halogen is a member selected from the group consisting of fluorine and chlorine at a temperature from 0° to 350°C. to make said aluminosilicate have a halogen content of 0.01–20 percent by weight.

2. Process for the isomerization of hydrocarbons which comprises contacting straight or less branched hydrocarbons with a catalyst at a temperature from 15° to 400°C. in the presence of a hydrogen-containing gas to produce more highly branched hydrocarbons, said catalyst being prepared by contacting crystalline aluminosilicate having openings of 6–15A. on which 0.01–5 percent by weight of a member selected from the group consisting of palladium and platinum as calculated in terms of the metal is supported with at least one halogenated hydrocarbons having from one to six carbon atoms wherein the halogen is a member selected from the group consisting of fluorine and chlorine at a temperature from 0° to 350°C. to make said aluminosilicate have a halogen content of 0.01–20 percent by weight.

* * * * *